United States Patent [19]

Warner

[11] Patent Number: 4,687,900
[45] Date of Patent: Aug. 18, 1987

[54] FUSING METHODS AND APPARATUS THEREFOR

[75] Inventor: Samuel Warner, Clark, N.J.

[73] Assignee: Joyal Products, Inc., Linden, N.J.

[21] Appl. No.: 743,770

[22] Filed: Jun. 12, 1985

[51] Int. Cl.⁴ .................... B23K 11/16; B23K 11/24
[52] U.S. Cl. ............................ 219/111; 219/56.22; 219/91.21
[58] Field of Search ............... 219/56.1, 56.22, 78.01, 219/86.22, 91.2, 91.21, 91.22, 111

[56] References Cited

U.S. PATENT DOCUMENTS

| 3,272,960 | 9/1966 | Smith | 219/56.21 |
| 3,421,212 | 1/1969 | Chabot | 219/56.22 X |
| 3,781,981 | 1/1974 | Miura et al. | 219/56.1 |
| 3,899,653 | 8/1975 | Spinnato | 219/111 X |

Primary Examiner—E. A. Goldberg
Assistant Examiner—C. M. Sigda
Attorney, Agent, or Firm—Lerner, David, Littenberg, Krumholz & Mentlik

[57] ABSTRACT

Methods and apparatus for fusing elements such as wires to one another. The elements to be fused are engaged in a notch or channel in one electrode, so that a first element, typically a stranded wire, contacts this electrode and also contacts the other element. A second electrode is engaged with the first element, and a fusing current is applied to the first element so that heat generated in the first element heats the second element as well. Where the second element is an insulated wire, heat from the first element vaporizes the insulation. The fusing current is applied as a series of low voltage, high current pulses.

15 Claims, 5 Drawing Figures

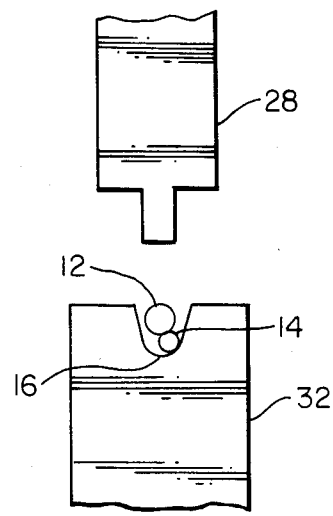
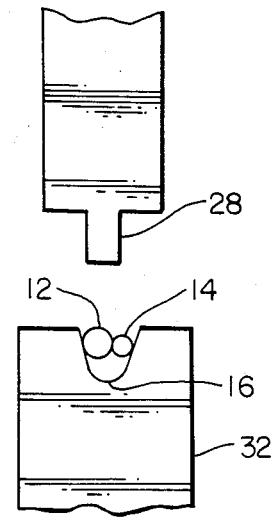
FIG. 3A        FIG. 3B
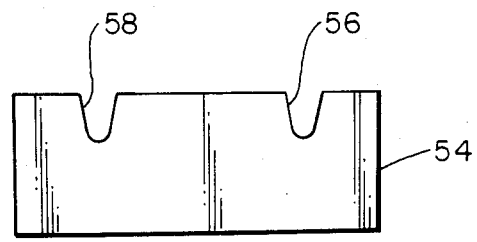
FIG. 4

FUSING METHODS AND APPARATUS THEREFOR

FIELD OF THE INVENTION

The present invention relates to improved fusing appartus and methods and more particularly to fusing apparatus and methods employing pulsation techniques to achieve fused and forged connections to insulated wires and the like without overheating the fusing electrodes or deforming the wire outside of the immediate environment of the weld.

BACKGROUND OF THE INVENTION

The use of fusing machines to achieve a splice or pigtail connection between conventional stranded lead wire and solid, insulated wire has become quite widespread since this is a highly advantageous technique for achieving a quick and uniform joint during a manufacturing operation. In fact, where a tinned, stranded lead wire is to be connected to a magnet wire of the type employed in motor windings or frequently as connections to transducers or the like, it is only through a fusing operation that such connections can be made if the magnet wire is not to be first stripped of its clear insulating coating. This occurs because such a coating as is employed in windings for motors and the like will not break down or vaporize at temperatures below a value which typically may be of the order of 200° C. Therefore, since a stripping of the clear coating on magnet wire tends to be somewhat onerous in a manufacturing process because the same is usually comprised of varnish or the like, the use of fusing equipment for such applications as joining conventional tinned lead wire to magnet wire from a motor winding, transducers which are similarly wound such as speakers or microphones, and circuit elements such as core inductors or the like, has become widespread, In addition, fusing apparatus is also employed to connect terminals and terminal lugs to magnet wires in manufacturing processes to insure a strong, uniform joint which is fused and conductive throughout so that the same is highly reliable.

In U.S. application Ser. No. 566,708, as filed in the name of Edward D. Riordan on Dec. 29, 1983 and entitled FUSING MACHINE, METHOD AND ELECTRODE SET and assigned to the assignee of the instant application, there is disclosed a fusing machine, method and electrode set which is highly advantageous for most applications for achieving a splice or pigtail connection between a conventional stranded wire whose end to be connected has typically been stripped and tinned and a magnet wire having a clear insulating coating remaining thereon. However, in certain applications it has been found that the fusing operation being conducted can result in an overheating of the electrode set within the fusing apparatus and a joint between wires which is not uniform throughout.

In the case of a non-uniform joint, fusing frequently occurs between a peripheral portion of the magnet wire and only a few strands within a stranded wire to be joined so that, in effect, a substantial portion of the cross-section of the stranded wire is not made part of the joint. This typically occurs when the magnet wire being employed is thick or is coated with an insulating material exhibiting extremely high temperature tolerance. The result is generally a weak, unreliable connection which is subject to early failure.

Furthermore, as is becoming increasingly the case, when lead wire, in the form of stranded wire, solid wire or magnet wire, is extremely thin conventional fusing apparatus, as well as that disclosed in U.S. application Ser. No. 566,708, supra, will often result in such substantial heat being applied to the stranded or solid wire that insulation thereon outside of the area of the joint will frequently be destroyed during the fusing operation or the wire is otherwise deformed. In the case of thin magnet wire, breaking of this wire outside of the area of the joint may also occur. This leads to unreliability in the resulting product and frequently early failure thereof. For the very same reasons, such fusing equipment may not be generally employed to connect lead or magnet wire to semiconductive devices such as diodes without providing heat sinks for the semiconductive device to avoid the destruction thereof.

SUMMARY OF THE INVENTION

The present invention proceeds from the discovery that use of a few cycles of welding current, as distinguished from the continuous welding current generally applied in fusing operations, drives heat into the work area, and more particularly, the relatively confined area of a joint between wires, so quickly that a uniform joint may be obtained without any overheating associated with the continuous heat normally employed in fusing operations. Thus, by using pulsation techniques in connection with fusing machines, intense, highly localized heating, limited to the environment of the joint can be achieved so that no deformation of the wires being heated occurs, overheating of the electrodes is avoided and, in fact, semiconductive devices such as diodes may be fused to lead wire or magnet wire without the use of any heat sink whatsoever. If this is done under a pressure or biasing force on one of the electrodes, the joint formed is forged in that the smaller diameter wire is driven into the other, and in any case a solid, uniformly fused joint of each wire occurs.

In a preferred embodiment of the instant invention, a commercially available welding control unit capable of precisely controlling the number of pulses of welding current applied to a pair of fusing electrodes is employed in connection with the fusing machine and electrode set disclosed in U.S. application Ser. No. 566,708. With such an arrangement and typically employing from 2 to 10 pulses of welding current, depending upon the gauges of the magnet and stranded wire employed, highly uniform joints which are solid throughout may be obtained without any deformation of the materials being fused and with complete avoidance of undue electrode heating and inadvertent fusion of stranded wire to the electrodes.

Therefore, it is a principal object of the instant invention to provide improved fuser apparatus and methods therefor employing pulsation techniques. Other objects and advantages of the present invention will become clear from the following detailed description of several exemplary embodiments thereof and the novel features will be particularly pointed out in conjunction with the claims appended hereto.

BRIEF DESCRIPTION OF THE DRAWINGS

The invention will be more clearly understood by reference to the following detailed description of an exemplary embodiment thereof in connection with the accompanying drawings in which:

FIG. 3A illustrates a preferred technique for conductor placement within fuser electrodes for achieving a pigtail connection;

FIG. 3B illustrates a preferred technique for conductor placement within fuser electrodes for achieving a splice connection;

FIG. 4 illustrates a modified fuser electrode structure allowing multiple fusing operations to be achieved.

DETAILED DESCRIPTION

Figure 1:
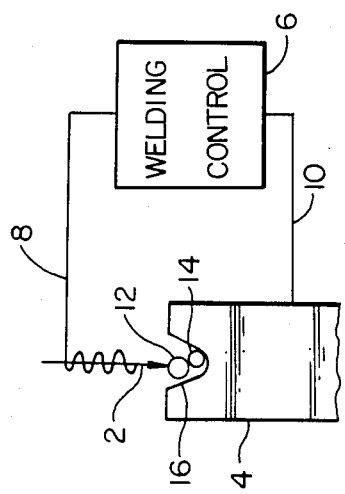
FIG. 1 is a schematic diagram serving to illustrate the principles of the present invention.

Referring now to FIG. 1 there is shown a schematic diagram serving to illustrate the principals of the present invention. The schematic diagram illustrated in FIG. 1 comprises first and second welding electrodes 2 and 4 and welding control 6 which is here employed to control the fusing operation to be performed. While the welding electrodes 2 and 4, schematically shown in FIG. 1, may be entirely conventional, it is preferred that the lower electrode 4 have a notch 16 therein sized to admit of a pair of wires to be fused and more particularly configured to closely fit the particular sized wires to be joined in the fusing operation to be conducted. Similarly, while the welding electrode 2 has been shown schematically, to best illustrate its function it will be appreciated that the welding electrode 2 should preferably be configured to closely fit within the notch 16 in the lower electrode 4 and, in fact, as shall become clear below, both the welding electrodes 2 and 4 may take precisely the same form and be configured in precisely the same manner as the welding electrodes described in connection with FIGS. 6–9 of U.S. application Ser. No. 566,708, as aforesaid.

The welding control 6 may take any conventional form of welding control capable of selectively supplying a discrete number of welding current pulses to the welding electrodes 2 and 4. In addition, as will be appreciated by those of ordinary skill in the art, the welding control 6 would preferably also act to control the displacement of the electrode 2 under a pressure of approximately 80 to 90 psi into a fusing relationship with wires 12 and 14 disposed within the welding electrode 4 and to remove the electrode 2 from such fusing relationship at the completion of the fusing operation in a manner well-know to those of ordinary skill in the art. Furthermore, welding control 6 would also act, through means not illustrated in FIG. 1, to cause the application of a blast of air or the like in the proximity of the wires 12 and 14 to be fused at the time the fusing opeation is initiated to clear fumes which may occur as a result of the fusing operation being conducted.

The welding control 6 is connected through the conductors 8 and 10 to the first and second electrodes 2 and 4 in the manner illustrated in FIG. 1. The welding control 6 may take the form of a Joyal Series M-SWH(84,154,304) welding control unit which is a microprocessor-controlled solid state synchronous welding control with solid state thyristor contactors. This device is available from Joyal Products, Inc. of Linden, N.J. The welding control 6 acts, as will be appreciated by those of ordinary skill in the art, to step down a standard 240, 380 or 440 volt AC supply to 2 to 4 volts and apply current pulses to the elecrodes 2 and 4 having an amplitude of from 4 to 10 thousand amperes. This is done, as will be readily appreciated by those of ordinary skill in the art, by the use of a 5 to 10 KVA transformer.

The welding control 6 acts to selectively apply a discrete number of current pulses, known as Heat Time, to the elecrodes 2 and 4 and additionally will selectively repeat the application of a selected number of current pulses to the electrode for a selected number of intervals. The number of current cycles applied in a burst to the electrodes 2 and 4 is known in the art as Heat Time, while the number of times (number of bursts) a discrete number of pulses is supplied to the electrodes 2 and 4 is known as Heat Pulse Time. The time between the application of each Heat Pulse burst is known as Cool Time and is also selectively controlled by the operator through the use of the welding control 6. When the Joyal microprocessor solid state synchronous welding control. Series M-SWH, is employed, the Squeeze Time, which is the time between when the electrode 2 is displaced and the first Heat Pulse is applied and the Hold Time which is the time which the electrode 2 is maintained in position after the fusing operation has been completed, are also controllable by an operator. In regard to Heat Time, Cool Time, Squeeze Time and Hold Time, intervals of 1/60th of a second, corresponding to one cycle of current, are employed as the timing interval since the same are readily available as a function of the frequency of the power supply.

As shown in FIG. 1, the fusing operation which takes place will typically involve a stranded wire 12 and a magnet wire 14, it being appreciated the the magnet wire 14 will usually take the form of a solid wire having a clear, insulating coating thereon which frequently can withstand temperatures up to and including 200° C., and in the case of glass insulating coatings may exceed 500° C. However, any solid wire such as associated with the lead of a conventional diode or other semiconductive device may be substituted in place of the magnet wire 14, and when the term magnet wire is employed it will be appreciated by those of ordinary skill in the art that the same only refers to a solid wire having the typical clear coating associated with wires employed to wind motors, generators, as well as those associated with various forms of transducers such as speakers and microphones.

Conversely, the stranded wire 12 may generally take the form of any conventional stranded wire having a plastic covering thereon, and when the same is used in a fusing operation such as here being described, a quarter-of-an-inch of insulating covering will normally be removed from the end of the wire and the exposed stranded wire may be tinned with conventional solder, silver solder, as well as lead and tin compounds. However, as shall be seen below, since the instant fusing operation effectively solidifies the stranded wire at the location of the joint and drives the magnet wire 14 into the stranded wire 12, which is solidified, tinning the end is unnecessary. Similarly, a solid wire having a corresponding portion of its insulation removed may be employed as wire 12 or, if a filler is used, wire 12 may also take the form of a magnet wire.

The wires selected to be joined may comprise any size desired. However, the notch 16 within electrode 4 should be chosen so the same closely conforms to the wire sizes being employed. For instance, the tinned, stranded wire 12 may be thick as desired and as thin as a 44 or 50 gauge wire. Similarly, the magnet wire 14 may be as thin as 42-45 gauge without any breakage occurring from the heat imposed during fusing. Those of ordinary skill in the art will appreciate that alternatively terminal lugs or the like may be fused to the magnet wire 14, and under these conditions the connection portion thereof would be disposed in place of the stranded wire 12 and placed in a relationship to the magnet wire 14, as dictated by the manner in which the terminal lug is configured.

Once the magnet wire 14 and the stranded wire 12 are placed within the notch 16 of the electrode 4, the electrode 2 or welding head would be brought down pneumatically under control of the welding control 6 at a pressure of from 80 to 90 psi, however, these values may be changed at will, it being noted that thicker wires require greater pressure. After a delay established by the Squeeze Time setting at the welding control 6, a number of current pulses, generally from 3 to 8, would be supplied in a burst (Heat Time) by the welding control 6 to the electrodes 2 and 4 through conductors 8 and 10. While the number of pulses applied by the welding control 6 is generally established experimentally by the operators it has been found that generally 3 to 8 pulses are appropriate, it being noted that one pulse is generally insufficent while more than 10 pulses in a single burst often begin to give rise to problems associated with an overheating of the electrodes, a deformation of the wires 12 and 14, and a melting of the insulation on the straned wire 12, as often occurs with continuous heat fusing operations. The Heat Time selected, i.e., the number of pulses applied in a single burst, will of course vary as a function of the sizes of the wires 12 and 14 being fused as well as the temperature coefficient of the clear coating on the magnet wire 14. However, it has been found that once an appropriate Heat Time has been determined by the operator through trial and error techniques, variations of from 18 to 25 gauge in wire size can be accommodated by that heat setting.

Similarly, the Heat Pulse time, i.e., the number of bursts employed in the fusing operation, as well as the Cool Time, i.e., time between bursts, are determined experimentally by the operator. However, as a general rule Heat Pulse settings of from 2 to 4 are sufficient and Cool Time settings may generally correspond to Heat Time settings. The Hold Time setting, i.e., the time between the end of the application of the last burst of pulses and the removal of the elecrtrode 12 from the joint, is generally selected so as to allow the joint to cool sufficiently so that the same is no longer fluid.

As will be readily appreciated by those of ordinary skill in the art from the schematic diagram illustrated in FIG. 1, once the fusing elecrode 2 has been brought down into a fusing relationship with the wires placed within the second electrode 4 under a pressure of from 80 to 90 psi, the stranded wire 12 acts as a filler so that once current pulses are applied all current will pass through the stranded wire causing the same to become intensely hot in a highly localized area between the electrodes 2 and 4. However, since the magnet wire 14 is insulated with a coating capable of withstanding substantial heat, only a very small amount of current will go through the magnet wire until near the end of the initial Heat Time interval when the coating thereon is vaporized whereupon substantially all of the current passes through the magnet wire will be forced into the stranded wire or forged as the stranded wire melts and conforms to the shape of the electrode portions surrounding it. This of course will only occur for a brief interval associated with the last pulse of pulses of the initial Heat Time burst of the second or even third Heat Time burst, depending upon the Heat Time selected.

As a result, those of ordinary skill in the art will appreciate that heat is driven into the magnetic wire so quickly that essentially the entire area of the bond associated with the stranded wire 12 and the magnet wire 14, which is driven into the stranded wire 12, is uniformly fused into a solid mass involving the entire cross-section of the stranded wire and the imbedded, forged magnet wire in the area of the joint. However, since the same occurs so quickly, the intense heating which results is highly localized. This means that only insulation on the stranded wire which is very close to the weld will be effected and large portions thereof will not be melted off as is frequently the case in fusing operations employing continuous heat.

Similarly, when the standard 2 to 3 inch lead of a semiconductive device such as a diode is employed in place of the stranded wire 12 or the magnet wire 14, the intense heating is so localized and so short in duration that the semiconductive device per se will not be effected. However, the lead of the device will be forged into the stranded wire 12, or the magnet wire 14 will be forged into the lead as it melts and conforms to the electrode 16 shape so that a uniform, solid joint is created. This allows fusing of semiconductors such as diodes or the like to a stranded or magnet wire to be achieved without use of heat sinks or the like, which has rarely been possible in the past. Furthermore, extremely fine stranded wires may be fused to magnet wires or extremely fine magnet wires may be fused to terminals or standard lead wire through this process to produce results through fusing which simply were unavailable in the past with fusing techniques employing continuous heat.

It has been found that at the location of the joint to be formed heating becomes so intense that the clear insulation on magnet wire, which typically can withstand 200° C., is vaporized without any difficulty to achieve a solid, uniform and complete fusing of the magnet and stranded wires throughout the entire cross-section of the joint and the magnet wire is imbedded in the stranded wire which then becomes solid upon cooling. Thus, those of ordinary skill in the art will appreciate that the partial fusing of the stranded wire, i.e., fusing only a few strands which often occurred using continuous heating techniques, is avoided without the deformation of the stranded wire and attendant melting of the insulation thereon which so frequently attended such fusing operations.

Those of ordinary skill in the art will appreciate that the fusing operation which takes place using the pulsation techniques of the instant invention may be likened to an avalanche phenomena wherein only a very small amount of current goes through the magnetic wire at the beginning of the fusion operation until the insulation breaks down. Once insulation breakdown occurs, however, almost all of the fusing current is conducted through the magnetic wire, which is then imbedded or forged into the already melted stranded wire, causing extremely intense heating to occur for an extremely short period. This results in uniform fusion of the materials at the interface of the electrodes due to the intense heating present therein. However, since this period of heating is of such a short duration, the heat is not substantially conveyed outside the area of the joint, and hence, no deformation or destruction of the insulating materials otherwise associated with the magnet wire 14 or the stranded wire 12 occur.

Figure 2:
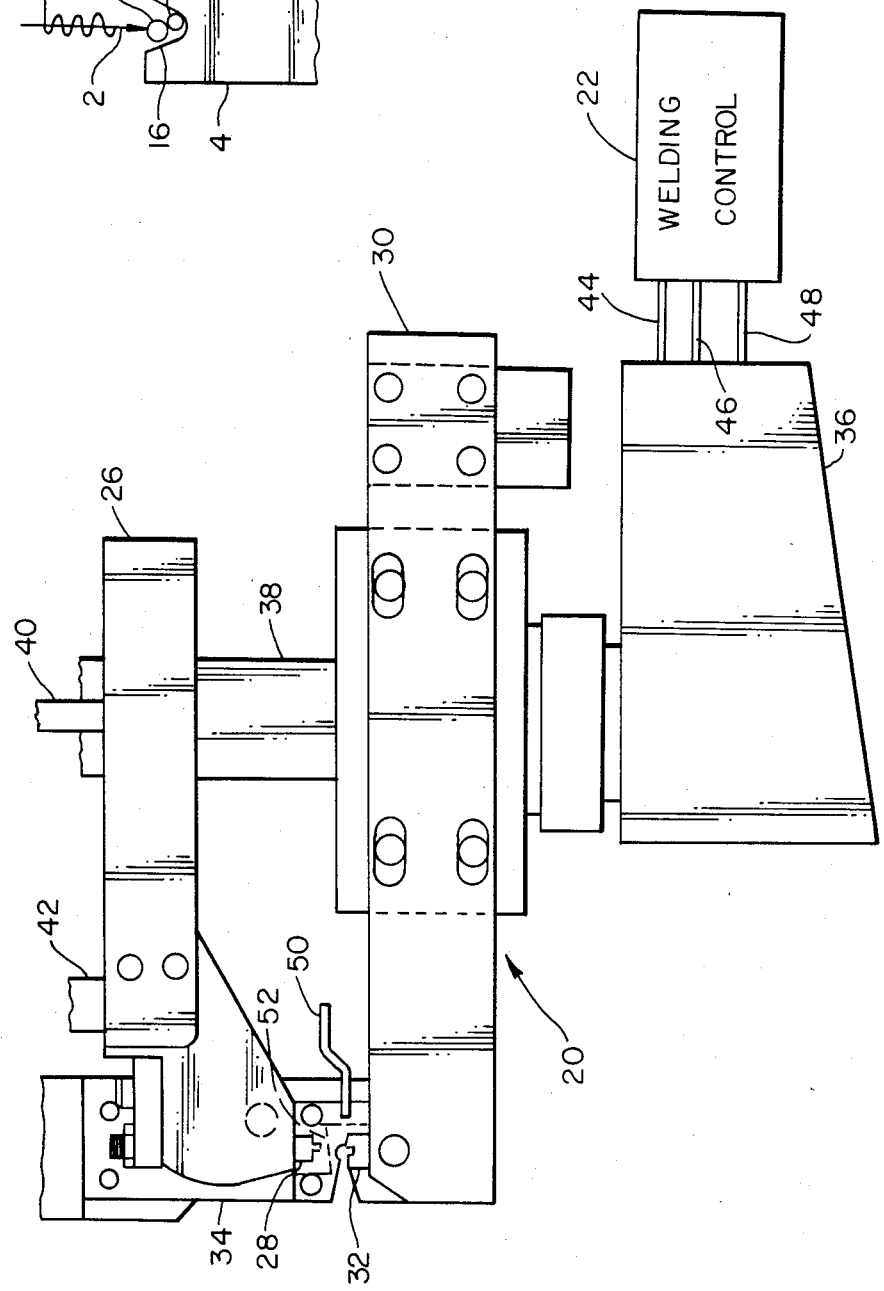
FIG. 2 illustrates exemplary structure of a preferred embodiment of the present invention.

Referring now to FIG. 2, the structure of a preferred embodiment of the present invention is set forth. The preferred embodiment of the present invention illustrated in FIG. 2 comprises a fuser head assembly 20 and a welding control unit 22. The fuser head or fuser device illustrated in FIG. 2 may take precisely the same form described in co-pending application Ser. No. 566,708, as aforesaid, and for this reason only the relevant portions thereof have been illustrated in FIG. 2. Similarly, the welding control 22 preferably takes the form of a Joyal Series M-SWH microprocessor solid state synchronous welding control with solid state thyristor contacts, as was described in connection with FIG. 1. While the form of fuser head disclosed in co-pending application Ser. No. 566,708 and the welding control 22 in the form of the Joyal Series M-SWH microprocessor solid state synchronous welding control are described in connection with a preferred embodiment, it will be appreciated by those of ordinary skill in the art that other forms of fuser heads and welding controls may be employed.

However, the aforesaid elements are preferred since in the case of a fuser head, electrode structure and actuating means are provided in a manner which generally avoids undesired fusing of portions of a stranded wire to the electrodes. In addition, automatic cutting of a fused joint in the case of a pigtail connection or the like is provided and generally a highly desirable, easy to use, positive acting structure is provided. Similarly, in the case of the welding control 22, all aspects of the fusing operation may be readily controlled by an operator in a highly simplified procedure which generally only involves the setting of thumbwheel switches or the like to determine such functions as Squeeze Time, Heat Time, Heat Pulse intervals, Cool Time, Hold Time and Cutter operation. The fuser head assembly whose most relevant portions are illustrated in FIG. 2, is more fully described and shown in connection with FIGS. 1 and 2 of applicant's co-pending application Ser. No. 566,708.

The fuser head assembly 20, illustrated in FIG. 2, comprises an upper electrode holder 26 having an upper electrode 28 disposed therein, a lower electrode holder 30 having a lower electrode 32 disposed therein, a cutter assembly 34, a mounting block assembly or base 36, a mounting post 38 upon which the lower electrode holder 30 and the cutter assembly 34 are rotatably mounted, and a guide 40 and displacement shaft 42 for the upper electrode assembly 26.

The welding control unit 22 is connected to the fuser head assembly illustrated in FIG. 2 through the conductor 44 which supplies a selected number of fusing current pulses to the Heat Time, Heat Pulse and Cool Time settings selected at the welding control unit 22, as foresaid. Additionally, as shown in FIG. 2, the welding control unit 22 is connected through conductors 46 and 48 to control the pneumatic displacement of the upper electrode holder 26 by the displacement shaft 42 and guide 40. Such displacement, as will be appreciated by those of ordinary skill in the art, will act to bring the upper electrode 28 into contact at a pressure of from 80 to 90 psi with wires mounted within the notch of the lower electrode 32. The conductor 48 applies air blast information to the welding head and more particularly, as will be appreciated by those of ordinary skill in the art, will cause an air blast to be emitted from the tube 50, schematically illustrated in FIG. 2, at the location of the joint being fused during the fusing process so that fumes which may be given off during the fusing process are removed.

While reference may be had to applicant's co-pending application Ser. No. 566,708 for each of the details of the fusing head illustrate in FIG. 2, it is here sufficient to appreciate that both the upper and lower electrodes 28 and 32 are replaceable and fully adjustable together with the upper and lower electrode holders 26 and 30 to assure appropriate positioning thereof when the upper electrode 28 is downwardly displaced into contact with the stranded wire of the pair of wires inserted into the lower electrode 32 for purposes of fusing. Once the welding head is properly adjusted, an operator would set appropriate Squeeze Time, Heat Time, Heat Pulse, Cool Time, and Cutter/Hold Time information into the welding control unit 22 by establishing thumbwheel settings of the like in a manner well known to those of ordinary skill in the art. Thereafter, wires to be fused would be placed into the notch of the lower electrode 32 so that a fusing operation therebetween may be initiated.

More particularly, if a pigtail connection was being made, as shown in FIG. 3A, the magnetic wire 14 would initially be placed in the notch 16 of the electrode 32 while the tinned, stripped end of a stranded wire 12 would be placed in the notch 16 above the magnet wire 14. This would ensure that when the upper electrode 28 was brought down, full and substantial contact with the stranded wire 12 would occur so that the same could act as a filler, be intensely heated in the area of the joint until such time as the stranded wire began to melt causing the magnet wire 14 to be imbedded, the stranded wire to conform to the electrode shape and the insulation on the magnetic wire broke down, causing an avalanche of current through both the stranded wire 12 and the magnetic wire 14. This will cause uniform fusion to occur throughout the portion of the wire underlying the electrode 28 and a solid, fused and forged joint to be formed upon cooling.

Similarly, as shown in FIG. 3B, if a splice connection were to be made, the alternate placement of the magnetic wire 14 and the stranded wire 12 in a side-by-side relationship may be employed. However, in each case substantial contact between the upper electrode 28 and the stranded wire 12 to cause maximum heating to the instant of avalanche is assured. It should also be noted that with the relationship between the stranded wire 12 and the magnet wire 14 illustrated in FIG. 3A more advantageous use of the automatic cutter assembly of the fusing head 20 shown in FIG. 2 is assured. It may be also pointed out that the position of the upper electrode 28 during the fusing operation may be shifted so that heat is applied to the face of the stranded wire 12. While stranded and magnet wire combinations have been considered in combination with FIGS. 3A and 3B, those of ordinary skill in the art will appreciate that alternatively the stranded wire may be replaced by a terminal connector or, in fact, the wire associated with either the stranded wire 12 or the magnet wire 14 may comprise a conventional solid wire or lead of a diode or other similar semiconductor device.

Once the magnet wire 14 and the stranded wire 28 have been placed within the notch 16 of the lower electrode 32 in the manner discussed in connection with FIGS. 3A and 3B, the fusing operation will be initiated by an operator either depresing a start button at the welding control 22 or, as is more usual, depressing an actuation pedal associated therewith. Once this occurs, the upper electrode holder 26 will be brought down pneumatically under the control of the displacement shaft 42 and guide 40 as a result of the information provided to the fusing head assembly by the welding control 22 through the conductor 46.

The welding head 22 is brought into contact with the stranded conductor at 80 to 90 psi and this result is assured by a spring bias pressure setting, not shown, also provided in the fusing head. This pressure on the welding head will assure good contact, and once melting of the stranded wire occurs, that the magnet wire is imbedded therein. After the expiration of the Squeeze Time set, a number of welding current pulses will be applied by the welding control 22 through conductor 44 to the electrodes 28 and 32, as determined by the Heat Time set. Thus, if the Heat Time has been set, for example, at 5, 5 current pulses having a value of from 5 to 10 thousand amperes will be applied to the electrodes 28 and 32 wherein each pulse has a duration of 1/60th of a second. This will result in the fusing operation described in connection with FIG. 1 between the stranded wire and the magnet wire positioned within the electrode 32.

If the Heat Pulse setting was established by an operator at a value greater than one, i.e., typically 2 or 3, would be employed. No further fusing pulses would be applied to the conductor 44 until the expiration of an interval which had been set by the operator for Cool Time. Thus, if Cool Time had been set at 5, at the termination of five 1/60ths of a second, or 1/12th of a second, a second series of fusing pulses corresponding in number to the Heat Time set would be applied by the welding control unit 22 through conductor 44 to the electrodes 28 and 32 so that the fusing cycle just described would be repeated. This mode of alternating a selected number of fusing pulses with a Cool Time period would be continued unti the number of cycles established by the Heat Pulse setting had been completed.

Once the number of Heat Pulse intervals set by the operator at the welding control unit had been completed, the upper electrode 22 would remain in its downwardly displaced fusing position until the Hold Time set by the operator had expired. In essence, this interval, again set in increments of 1/60th of a second, would be set to allow the fused joint established to cool sufficiently so that the stranded wire and the imbedded magnet wire in the area of the joint was a solid mass and would not be disturbed upon its removal. Upon expiration of the Hold Time set, the entire upper elecrode holder 26 would be displaced in an upward direction through the action of the guide 40 and the displacement shaft 42. Thereafter in the case of a pigtail connection, the cutter assembly 38 could be actuated to bring the cutter plate 52 down to trim the pigtail joint made. Obviously, in the case of a splice connection or the like, the cutter assembly 34 would not be actuated and, in fact, would be rotated about the mounting post 38 away from the environment of the elecrrodes 28 and 32.

While the fuser head assembly described in connection with FIG. 2 has been described in detail in association with the preferred embodiment of the instant invention, those of ordinary skill in the art will appreciate that in many instances only one or a few Heat Pulse intervals will be required for the fused connections here being discussed. Under these conditions, or if otherwise directed, a multiple operation electrode assembly might be employed in place of the lower electrode 32 described in connection with FIGS. 2 and 3. Thus, for instance, as shown in FIG. 4, a modified fuser electrode structure which allows multiple fusing operations to be achieved may be employed.

The fuser electrode 54 shown in FIG. 4 comprises a pair of notches 56 and 58 which are configured in the same manner as the single notch 16 illustrated in FIGS. 3A and 3B. This assembly would be used in processing operations where an operator was typically operating the fusing apparatus with a foot pedal and would place wire to be fused within one notch 56 or 58 while a fusing operation was occurring in the remaining notch 58 or 56. The operation, as will be reaidly appreciated by those of ordinary skill in the art, would be such that the upper fusing electrode 28 would shuttle back and forth between the notches 56 and 58 as a function of each depression of the foot pedal actuating the welding control unit 22.

While details of the fusing electrodes 28 and 32 have not been set forth in great length herein, those of ordinary skill in the art will appreciate that the same will be configured precisely as described in applicant's co-pending application Ser. No. 566,708.

Although the instant invention has been described in connection with a preferred exemplary embodiment thereof, it will be understood that many modifications and variations thereof will be readily apparent to those of ordinary skill in the art. Therefore, it is manifestly intended that this invention be only limited by the claims and the equivalents thereof.

What is claimed is:

1. A method for fusing comprising the steps of:
   providing a first fusing electrode having a channel therein closely configured to admit first and second elements to be fused;
   disposing first and second elements to be fused in said channel so that said first element contacts said first fusing electrode and also contacts said second element;
   placing a second fusing electrode in contact with said first element under pressure;
   applying a fusing current as a plurality of low voltage, high current pulses to said second fusion electrode while said second fusing electrode is in contact with said first element so that said fusing current initially passes through said first element to said first fusing electrode, and heat is generated in said first element, whereby heat is transferred from said first element to said second element, said plurality of low voltage, high current pulses being sufficient to cause intense heating of said first and second elements to occur in an area of contact of said first and second elements within said channel and for a duration which is too short for substantial heating of either of said first and second elements to occur at portions of said first and second elements remote from said channel.

2. The method according to claim 1 wherein said step of applying said fusing current includes the step of applying a burst of said low voltage, high current pulses comprising a number of said pulses which is greater than one and less than twelve.

3. The method according to claim 2 wherein said step of applying a burst of low voltage, high current pulses is repeated after a cooling interval.

4. The method according to claim 3 wherein said cooling interval corresponds in time to an interval required for the application of one of said bursts of pulses.

5. The method according to any of claims 1, 2 or 3 additionally comprising the step of providing a squeeze time interval intermediate said steps of placing and applying.

6. The method according to claim 1 wherein said second element comprises a solid wire having an insulating coating thereon, said number of pulses being sufficient to cause heat generated in said first element to vaporize said insulating coating and cause said fusing current to be conducted briefly through both said first and second elements.

7. A method of fusiong a solid wire having an insulating coating thereon to a stranded wire comprising the steps of:
providing a first fusing electrode having a notch therein closely configured to receive portions of said solid wire and said stranded wire to be joined;
disposing said solid wire and said stranded wire in said notch so that said stranded wire contacts said first fusing electrode and said stranded wire also contacts said solid wire having an insulating coating thereon;
placing a second fusing electrode under pressure in contact with at least said stranded wire; and
applying a fusing current as a plurality of low voltage, high current pulses to said second fusing electrode while said second fusing electrode is in contact with said stranded wire so that said fusing current initially passes through said stranded wire to said first fusing electrode and heat is generated in said stranded wire, whereby heat is transferred from said stranded wire to said solid wire, said plurality of low voltage, high current pulses being sufficient in number to cause heat generated in said stranded wire to melt said insulating coating on said solid wire in the area of the stranded wire to cause fusing current to briefly pass both through said stranded wire and said soild wire and establish a uniform fused joint therebetween but insufficient in number for substantial heating of said stranded wire and said solid wire in portions thereof remote from said notch.

8. The method according to claim 7 wherein said step of applying a fusing current includes the step of applying a burst of said low voltage, high current pulses comprising a number of said pulses which is greater than one and less than twelve.

9. The method according to claim 7 wherein said step of applying a burst of low voltage, high current pulses is repeated after a cooling interval.

10. Fusing apparatus comprising:
first electrode means having a channel therein closely sized to receive first and second elements to be fused to form a joint therebetween, said channel being configured to receive said first and second elements so that said first element contacts said first fusing electrode and said first element also contacts said second element when both said first and second elements are disposed in said channel;
second electrode means having a portion formed to enter said channel in said first electrode means and contact at least said first element when said first and second elements are disposed within said channel;
means for displacing said second electrode means under pressure to an entry position in said channel and into contact with at least said first element when said first and second elements are disposed within said channel; and
means for applying a fusing current as a plurality of low voltage, high current pulses to said second fusing electrode, while said second fusing electrode is in contact with said first element so that said fusing current initially passes through said first element to said first fusing electrode, and heat is generated in said first element, whereby heat is transferred from said first element to said second element, said means for applying a current being operative to apply a number of said pulses sufficient to cause intense heating of said first and second elements to occur in a contacting area of said first and second elements when the same are disposed within said channel and insufficient for substantial heating of either said first and second elements to occur at portions of said first and second elements remote from said channel.

11. The apparatus according to claim 10 wherein said channel is sized to receive a stranded wire and a solid wire having an insulating coating thereon so that said stranded wire contacts said first electrode and said stranded wire also contacts said solid wire, said means for displacing said second electrode being operative to contact said second electrode with said stranded wire, said means for applying a fusing current being operative to apply a plurality of said low voltage, high current pulses sufficient in number to cause heat generated by said stranded wire to melt said insulating coating on said solid wire, to cause fusing current to briefly pass both through said stranded wire and said solid wire and establish a uniform fused joint therebetween.

12. The apparatus according to claim 10 wherein said means for applying a fusing current includes means for applying a burst of said low voltage, high current pulses including a number of said pulses which is greater than one and less than twelve.

13. The apparatus according to claim 10 wherein said means for applying a fusing current includes selectively operable means for setting a cooling interval and repeating applicaton of a burst of pulses after said cooling interval.

14. The apparatus according to claim 13 wherein said means for setting a cooling interval is operable to set said cooling interval to correspond to an interval required for an application of said burst of pulses.

15. The apparatus according to claim 10 wherein said first electrode means comprises a pair of channels each as aforesaid, the apparatus further comprising means for aligning said second electrode means alternately with each of said channels.

* * * * *

UNITED STATES PATENT AND TRADEMARK OFFICE
CERTIFICATE OF CORRECTION

PATENT NO. : 4,687,900

DATED : August 18, 1987

INVENTOR(S) : Samuel Warner

It is certified that error appears in the above-identified patent and that said Letters Patent is hereby corrected as shown below:

Column 2, line 55, "fusion", should read --fusing--.

Column 5, line 22, "operators", should read --operator--.

Column 5, line 64, after "wire", insert --14 as well as the stranded wire 12. As this occurs, and it may or may not occur until the second Heat Time interval, the magnetic wire--.

Column 5, line 68, "of"(first occurrence), should read --or--.

Column 6, line 1, "of", should read --or--.

Column 7, line 54, after "the", insert --electrodes 28 and 32 within the welding head as controlled by the--.

Column 8, line 6, "illustrate", should read --illustrated--.

Column 8, line 18, "of"(first occurrence), should read --or--.

Column 9, line 38, "unti", should read --until--.

Column 10, line 13, "reaidly", should read --readily--.

Column 10, line 32, "for", should read --of--.

Column 10, line 43, "fusion", should read --fusing--.

Column 11, line 12, "fusiong", should read --fusing--.

Signed and Sealed this

Twenty-third Day of February, 1988

*Attest:*

DONALD J. QUIGG

*Attesting Officer*  *Commissioner of Patents and Trademarks*